(12) United States Patent
Lu et al.

(10) Patent No.: US 10,884,309 B2
(45) Date of Patent: Jan. 5, 2021

(54) TRANSFERABLE THIN-FILM OPTICAL DEVICES

(71) Applicant: Facebook Technologies, LLC, Menlo Park, CA (US)

(72) Inventors: Lu Lu, Menlo Park, CA (US); Junren Wang, Menlo Park, CA (US); Scott McEldowney, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/274,211

(22) Filed: Feb. 12, 2019

(65) Prior Publication Data
US 2020/0050031 A1 Feb. 13, 2020

Related U.S. Application Data

(60) Provisional application No. 62/716,129, filed on Aug. 8, 2018.

(51) Int. Cl.
| | | |
|---|---|---|
| *G02F 1/1333* | (2006.01) | |
| *G02F 1/139* | (2006.01) | |
| *G02F 1/03* | (2006.01) | |
| *G02B 27/01* | (2006.01) | |
| *G02B 27/00* | (2006.01) | |

(52) U.S. Cl.
CPC .......... *G02F 1/139* (2013.01); *G02B 27/017* (2013.01); *G02F 1/0322* (2013.01); *G02F 1/133305* (2013.01); *G02B 27/0093* (2013.01); *G02F 2201/307* (2013.01)

(58) Field of Classification Search
None
See application file for complete search history.

(56) References Cited

U.S. PATENT DOCUMENTS

| | | | |
|---|---|---|---|
| 8,730,419 B2 | 5/2014 | Yamazaki | |
| 2005/0067094 A1* | 3/2005 | Chen | B32B 37/20 |
| | | | 156/269 |
| 2006/0285026 A1* | 12/2006 | Robinson | G02B 5/3083 |
| | | | 349/15 |
| 2011/0174431 A1 | 7/2011 | Darmes et al. | |
| 2015/0301352 A1 | 10/2015 | Wang | |
| 2016/0276589 A1 | 9/2016 | Lee et al. | |
| 2016/0342374 A1 | 11/2016 | Wang | |
| 2019/0049790 A1* | 2/2019 | Okabe | G02F 1/133308 |

(Continued)

OTHER PUBLICATIONS

Y.R. Anusha, "Flexible Electronics an Overview," available on-line at URL: https://www.slideshare.net/AnushaYR/flexible-electronics-56603431, retrieved on Oct. 23, 2019, 14 pages.

(Continued)

*Primary Examiner* — James A Dudek
(74) *Attorney, Agent, or Firm* — Millburn IP PLLC

(57) ABSTRACT

A transferrable thin-film optical device and a head-mounted display are provided. A transferrable thin-film optical device comprises a thin-film layer providing at least one predetermined optical function. The thin-film layer is configured to be removably attached to a substrate, such that a molecular pattern for the at least one predetermined optical function of the thin-film layer is preserved post removal.

18 Claims, 7 Drawing Sheets

(56) References Cited

U.S. PATENT DOCUMENTS

2019/0193382 A1* 6/2019 Park .................. B32B 38/0004

OTHER PUBLICATIONS

Unknown Author, "Wearable device breakthrough: skin-like, thin-film transistors for flexible displays," originally published online at http://www.iamvr.co/ on Aug. 5, 2016, now available on-line at URL: https://web.archive.org/web/20160809162007/http://www.iamvr.co/wearable-device-breakthrough-skin-like/, retrieved on Feb. 3, 2020, 1 page.

Enterprise Canada, "Xerox Research Centre of Canada and NanoIntegris Advance Flexible Electronic Devices With Thin Film Transistor Package," published on-line on Jan. 26, 2016 at URL: http://www.mnialive.com/articles/xerox-research-centre-of-canada-and-nanointegris-advance-flexible-electronic-devices-with-thin-film-, retrieved on Oct. 23, 2019, 2 pages.

The Capasso Group at Harvard University, "Flat Lens for Visible Wavelengths," dated Jun. 4, 2016, available on-line at URL: https://www.seas.harvard.edu/capasso/2016/06/flat-lens-for-visible-wavelengths/, retrieved on Oct. 23, 2019, 2 pages.

The Capasso Group at Harvard University, "A metalens over a 60nm bandwidth in the visible," dated Mar. 27, 2017, available on-line at URL: https://www.seas.harvard.edu/capasso/2017/03/an-metalens-over-a-60nm-bandwidth-in-the-visible/, retrieved on Oct. 23, 2019, 5 pages.

She, A., et al., "Adaptive metalenses with simultaneous electrical control of focal length, astigmatism, and shift," Sciences Advances, Feb. 23, 2018, 4(2),eaap9957, also available on-line at URL: http://advances.sciencemag.org/content/4/2/eaap9957, retrieved on Oct. 23, 2019, 7 pages.

Stumpe, J., "Photochromatic Materials for Polarization und Diffractive Elements," dated May 31, 2012, available on-line at URL: https://tgzchemie.de/images/Donwload_PDF/Innovationsforum_Farbstoffe/Vortrag_Dr.J.Stumpe_Fraunhofer%20IAP_Potsdam.pdf, retrieved on Oct. 23, 2019, 24 pages.

Xiang, J., et al., "Electrooptic Response of Chiral Nematic Liquid Crystals with Oblique Helicoidal Director," Physical Review Letters, published May 2014, also available at URL: https://www.researchgate.net/publication/262302161_Electrooptic_Response_of_Chiral_Nematic_Liquid_Crystals_with_Oblique_Helicoidal_Director, retrieved on Oct. 23, 2019, 15 pages.

Xiang, J., et al., "Liquid Crystals: Electrically Tunable Selective Reflection of Light from Ultraviolet to Visible and Infrared by Heliconical Cholesterics," Advanced Materials, 27(19), Mar. 2015, also available on-line at URL: https://www.researchgate.net/publication/274195441_Liquid_Crystals_Electrically_Tunable_Selective_Reflection_of_Light_from_Ultraviolet_to_Visible_and_Infrared_by_Heliconical_Cholesterics_Adv_Mater_192015, retrieved on Oct. 23, 2019, 6 pages.

Xiang, J., et al., "Electrically tunable laser based on oblique heliconical cholesteric liquid crystal," Proceedings of the National Academy of Sciences, Nov. 15, 2016, vol. 113, No. 46, pp. 12925-12928, 4 pages.

Alex Heath, "Facebook is working on futuristic smart glasses—here are new details," Business Insider, available on-line at URL: https://www.businessinsider.com/facebook-smart-glasses-ar-oculus-patent-2017-8, retrieve on Feb. 4, 2020, 4 pages.

International Search Report and Written Opinion dated Jun. 7, 2019, in International Application No. PCT/US2019/017907, filed on Feb. 13, 2019 (11 pages).

* cited by examiner

TRANSFERABLE THIN-FILM OPTICAL DEVICES

CROSS REFERENCE TO RELATED APPLICATIONS

This application claims the benefit of U.S. Provisional Application No. 62/716,129, filed on Aug. 8, 2018, which is incorporated by reference in its entirety.

BACKGROUND

Thin-film devices are applied to almost all modern scientific instruments, and these devices, especially thin-film optical devices, play an essential role in the performances of the instruments, therefore, they are attracting more and more attention. Now there are numerous kinds of thin-film optical devices and their applications are very diversified. Thin-film optical devices can function as a transmissive or reflective optical element, such as a prism, a lens, a beam refractor, a lens/prims array, a phase retarder. However, currently these types of optical elements are often printed directly on a substrate, such that removal from the substrate would cause tearing or stress to the thin films, which may disturb the pattern of the thin films and accordingly, degrade the optical properties of the optical elements. In addition, currently these types of optical elements are substantially difficult to be transferred and/or handled without degrading the optical properties of the optical elements.

BRIEF SUMMARY OF THE DISCLOSURE

One aspect of the present disclosure provides a transferrable thin-film optical device. The transferrable thin-film optical device comprises a thin-film layer providing at least one predetermined optical function. The thin-film layer is configured to be removably attached to a substrate, such that a molecular pattern for the at least one predetermined optical function of the thin-film layer is preserved post removal.

Another aspect of the present disclosure provides a head-mounted display (HMD). The head-mounted display (HMD) comprises a thin-film optical device that is optically coupled to the HMD and is attached to a surface of the HMD after being detached from a substrate. The thin-film optical device provides at least one predetermined optical function and comprises a thin-film layer providing the at least one predetermined optical function and configured to removably attach to the substrate, such that a molecular pattern for the at least one predetermined optical function of the thin-film layer is preserved post removal.

Other aspects of the present disclosure can be understood by those skilled in the art in light of the description, the claims, and the drawings of the present disclosure.

DETAILED DESCRIPTION

Figure 1:
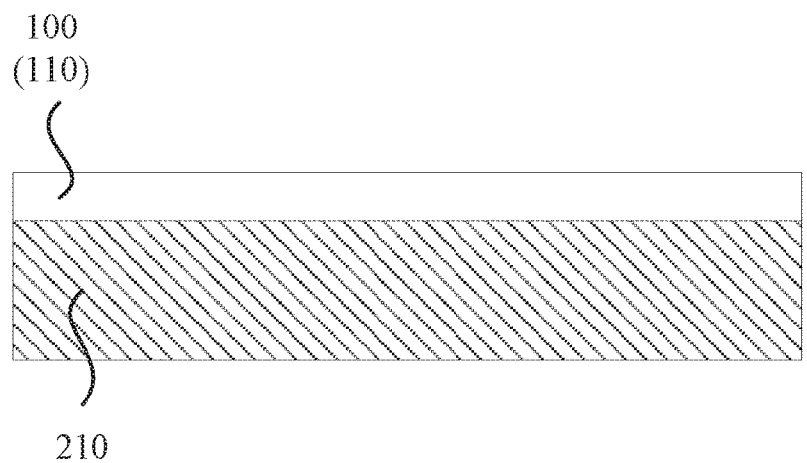
FIG. 1 illustrates an example of a transferrable thin-film optical device consistent with the disclosed embodiments.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

FIG. 1 illustrates an example of a transferrable thin-film optical device 100 consistent with the disclosed embodiments. As shown in FIG. 1, the transferrable thin-film optical device 100 may comprise a thin-film layer 110 providing at least one predetermined optical function. In some embodiments, the thin-film layer 110 may be structurally configured or fabricated to have a molecular pattern for the predetermined optical function of the transferrable thin-film optical device 100. The transferrable thin-film optical device 100 may be removably attached to a first substrate 210, such that the molecular pattern for the predetermined optical function of the thin-film layer is preserved post removal. In some embodiments, the thin-film layer 110 may have a liquid crystal (LC) alignment that can be preserved through the separation process, i.e., a molecular pattern for the at least one predetermined optical function of the thin-film layer 110 may be preserved post removal.

The transferrable thin-film optical device 100 may function as a transmissive or reflective optical element, such as a prism, a lens, a beam refractor, a lens/prims array, and a phase retarder, etc. Currently, these types of optical elements can be printed directly on a substrate, however, removal from the substrate would cause tearing or stress to the thin-film layer, which may disturb the molecular pattern and accordingly, degrade the optical function of the optical elements.

Further, the transferrable thin-film optical device 100 may be a flexible thin-film optical device. That is, the transferrable thin-film optical device 100 may be bend, curved, or rolled, etc., i.e., realizing a transferrable and flexible thin-film optical device, which may be applied where rigid optical elements may not fit, such as on curved surface or flexible structures.

Figure 2A:
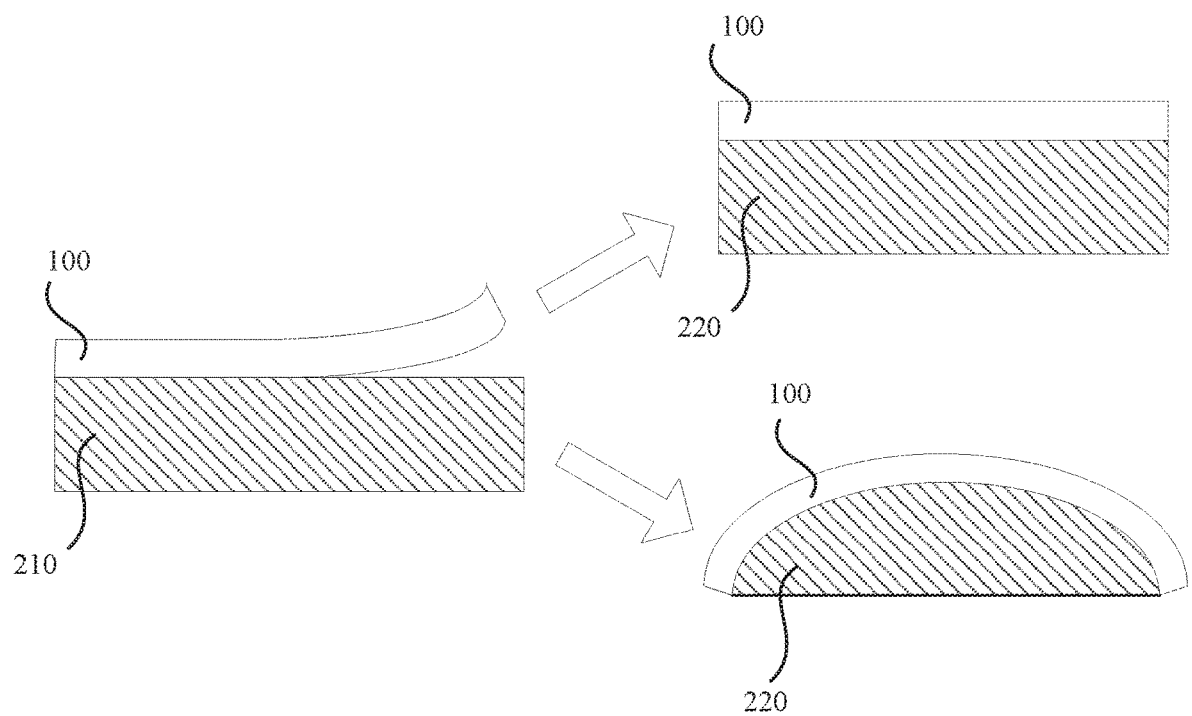
FIGS. 2A-2B illustrate application examples of a transferrable thin-film optical device consistent with the disclosed embodiments.
Figure 2B:
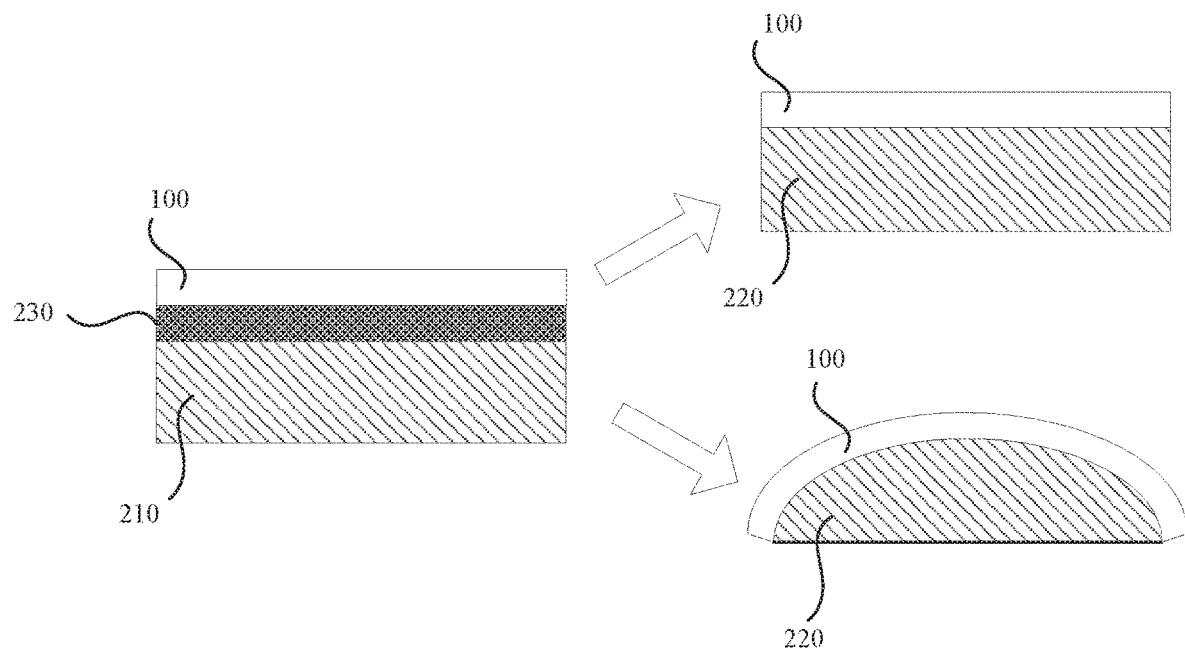

In some embodiments, after separated from the first substrate, the transferrable thin-film optical device may be transferred to a second substrate, without affecting the predetermined optical function. FIGS. 2A-2B illustrate application examples of a transferrable thin-film optical device 100 consistent with the disclosed embodiments. As shown in FIG. 2A, the transferrable thin-film optical device 100 may be initially disposed over a first substrate 210 and, then, removed from the first substrate 210 and reattached over a second substrate 220. In particular, because the transferrable thin-film optical device 100 is flexible, the surface of the second substrate 220 where the transferrable thin-film optical device 100 is attached may be flat, curved or in any appropriate shape. Further, the transferrable thin-film optical device 100 may be attached to any appropriate surface, or multiple transferrable thin-film optical devices 100 may be stacked together to form optical series.

In some embodiments, the first substrate 210 may be used to fabricate the transferrable thin-film optical device 100, to store the transferrable thin-film optical device 100, to transport the transferrable thin-film optical device 100, or to optically coupled to the transferrable thin-film optical device 100 to use optical functions provided by the transferrable thin-film optical device 100, etc. Similarly, the second substrate 220 may also be used to fabricate the transferrable thin-film optical device 100, to store the transferrable thin-film optical device 100, to transport the transferrable thin-film optical device 100, or to optically coupled to the transferrable thin-film optical device 100 to use optical functions provided by the transferrable thin-film optical device 100, etc.

That is, the transferrable thin-film optical device 100 may be removably attached to the first substrate 210 and then transferred to the second substrate 220 without affecting the optical characteristics (i.e., the predetermined optical function) of the transferrable thin-film optical device 100. In some embodiments, the transferrable thin-film optical device 100 may be further transferred to a third substrate, and so on, and the third substrate may be configured to be optically coupled to the transferrable thin-film optical device 100 to use the optical functions provided by the transferrable thin-film optical device 100.

Further, the transferring process may occur in various application scenarios. For example, the first substrate 210 may be used to fabricate the transferrable thin-film optical device 100 and, then, the transferrable thin-film optical device 100 may be removed from the first substrate 210 and attached to the second substrate 220 for storage and/or transportation, or may be attached to the second substrate 220 for providing optical functions. The first substrate 210 may also be used to store or transport the transferrable thin-film optical device 100 and, then, the transferrable thin-film optical device 100 may be removed from the first substrate 210 and attached to the second substrate 220 for providing optical functions. Further, the transferrable thin-film optical device 100 may be attached to the first substrate 210 and provide optical functions, then the transferrable thin-film optical device 100 may be removed from the first substrate 210 and attached to the second substrate 220 for providing the optical functions. Other scenarios may also be included.

Various methods may be used to detach the transferrable thin-film optical device 100 from a substrate. In some embodiments, a peeling method, such as a thermal release method, may be used. For example, as FIG. 2A shows, using a thermal release tape, the transferrable thin-film optical device 100 may be peeled off from the first substrate 210, then transferred to the second substrate 220.

In some embodiments, a non-peeling method may be used to separate the transferrable thin-film optical device 100 from the substrate. For example, the thin-film layer may be removeable attached to the substrate by a soluble element, and the transferrable thin-film optical device 100 may be separated from the first substrate 210 by dissolving the soluble element. In one embodiment, as FIG. 2B shows, a barrier layer 230 may be disposed between the first substrate 210 and the transferrable thin-film optical device 100. The thickness of the barrier layer 230 may be approximately 0.1-10 μm. Through removing the barrier layer 230, the transferrable thin-film optical device 100 may be detached from the first substrate 210, then transferred to the second substrate 220.

In some embodiments, the barrier layer 230 may be a soluble synthetic polymer layer which is made of, for example, photo-alignment material (PMA), polyvinyl alcohol (PVA). Through dissolving the barrier layer 230, the transferrable thin-film optical device 100 may be detached from the first substrate 210, then transferred to the second substrate 220. Other methods may also be used to detach the transferrable thin-film optical device 100 from a substrate, which are not limited by the present discourse.

Figure 3A:
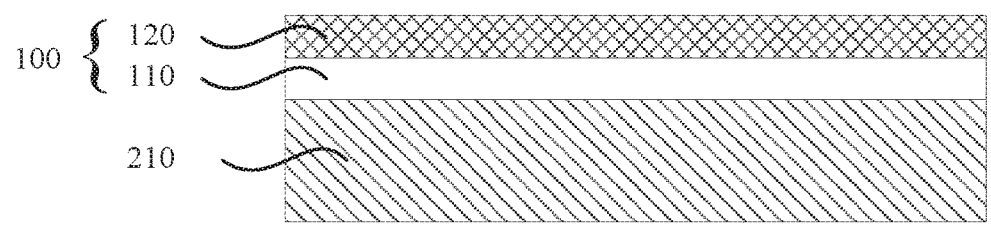
FIGS. 3A-3B illustrate other examples of a transferrable thin-film optical device consistent with the disclosed embodiments.
Figure 3B:
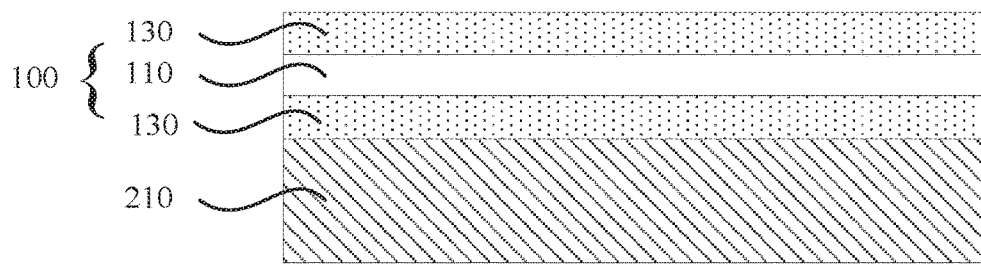

Further, the transferrable thin-film liquid crystal optical device 110 may include other structural configurations for various implementations. FIGS. 3A-3B illustrate other examples of a transferrable thin-film optical device consistent with the disclosed embodiments.

As shown in FIG. 3A, the thin-film layer 110 has a first surface facing the substrate 210 and an opposing second surface far away from the substrate 210. The transferrable thin-film optical device 100 may further include an adhesives layer 120 disposed on the second surface of the thin-film layer 110. The adhesives layer 120 may be configured to provide flexible feature and additional protection. Due to the additional protection provided by the adhesives layer 120, the transferrable thin-film liquid crystal optical device 110 may be for example, handled, transported, etc. for various use without worrying about damaging the thin-film layer 110.

In some embodiments, the refractive index of the adhesives layer 120 may be adjusted as an index-matching layer or index-mismatching layer for diverse optical design purposes. In some embodiments, the adhesives layer 120 may be an ultraviolet (UV) curable isotropic adhesives layer. In some embodiments, the thickness of the thin-film layer 110 may be approximately 0.5~10 μm, and the thickness of the adhesives layer 120 may be approximately 1-60 μm.

Further, the combined adhesives layer 120 and the thin-film layer 110 may be transferred as a single entity. That is, the adhesives layer 120 and the thin-film layer 110 may be together separated off from the substrate 210 using a peeling or non-peeling method.

In some embodiments, the transferrable thin-film optical device 100 may be a passive device, i.e., non-switchable. In some embodiments, the transferrable thin-film optical device 100 may be an active device, i.e., switchable, and in this case, as shown in FIG. 3B, the transferrable thin-film optical device 100 may further include electrodes 130, which sandwich the thin-film layer 110 to provide driving voltages to the thin-film layer 110. The electrode 130 may include a flexible transparent conductive layer (such as indium tin oxide (ITO)) disposed on a plastic film (such as PET).

Further, the combined electrodes 130 and the thin-film layer 110 may be transferred as a single entity. That is, the electrodes 130 and the thin-film layer 110 may be together peeled off from the substrate 210 using peeling or non-peeling method. As shown in FIG. 3B, the transparent conductive layers 130 are formed before the transferrable thin-film optical device 100 is removed from the first substrate 210, however, in some embodiments, the transparent conductive layers 130 may be formed after the transferrable thin-film liquid crystal optical device 100 is removed from the first substrate 210.

Returning to FIG. 1, the transferrable thin-film optical device 100 may be a transferrable thin-film liquid crystal (LC) optical device. The thin-film layer 110 may have an LC alignment that can be preserved through the separation process, i.e., an LC molecular pattern for the at least one predetermined optical function of the thin-film layer 110 may be preserved post removal. In the following description, the transferrable thin-film LC optical device is referred to as a thin-film LC optical device for short.

In some embodiments, the thin-film layer 110 in the thin-film LC optical device 100 may be a liquid crystal polymer (LCP) layer including mixed LC materials and photo-crosslinked polymers. In some embodiments, the thin-film layer 110 may be a bulk photo-alignment material (PAM) layer, which has been aligned with polarized light and photo-crosslinked with induced birefringence. The bulk PAM layer may be formed by multifunctional polymers which offer both photo-alignment and birefringence. In particular, the multifunctional polymer may include different types of side groups which introduce different functionalities, for example, a photochromic group results in the generation of anisotropy upon linearly polarized irradiation, and a mesogenic group contributes to the establishment of liquid crystalline properties in the polymer, etc. In some embodiments, the photochromic group may include an azobenzene group, a cinnamic ester group, etc.

The LCP layer or the bulk PAM layer may be structurally configured or fabricated to have a certain pattern of LC molecules (i.e., mesogenic molecules), thereby providing the optical functions of the thin-film LC optical device 100. Depending on the structured pattern of LC molecules, the thin-film LC optical device 100 may function as a transmissive or reflective optical element, such as a prism, a lens, a beam refractor, a lens/prims array, a phase retarder, etc., which opens up the possibilities to adaptive, light efficient, light-weight and customized optical elements.

The thin-film LC optical device 100 may be active or passive. As discussed above in FIG. 3B, to realize an active transferrable thin-film optical device, the electrodes 130 may sandwich the thin-film layer 110 to provide driving voltages to the thin-film layer 110. In particular, in the active thin-film LC optical device 100, the electrodes 130 may sandwich both a LCP layer and a PAM layer, or sandwich a bulk PAM layer. In the passive thin-film LC optical device 100, the adhesive layer and the substrate may sandwich both an LCP layer and a PAM layer or sandwich a bulk PAM layer, however, in some embodiments, the adhesive layer may be omitted.

In some embodiments, the LC materials (i.e., mesogenic materials) in the active thin-film LC optical device 100 may include nematic LCs, twist-bend LCs, or chiral nematic LCs (or LCs with chiral dopant), etc., while the LC materials in the passive thin-film LC optical device 100 may include nematic LCs, or chiral nematic LCs (or LCs with chiral dopant), etc. The LC materials may have positive or negative dielectric anisotropy.

Further, the thin-film LC optical device 100 may have a twisted or non-twisted structure. The chiral nematic LCs (or LCs with chiral dopant) may enable the thin-film LC optical device 100 to have a twisted structure. For example, along with the light propagation direction in the thin-film LC optical device, a dual-twisted or multiple-twisted structure layer may offer achromatic performance on efficiency in the thin-film LC optical device 100. Along with the light propagation direction in the thin-film LC optical device, the non-twisted structure may be simpler to fabricate than a twisted structure, however, the non-twisted structure may be merely optimized for monochromatic light.

In some embodiments, the optical function of the thin-film LC optical device 100 (i.e., the structured pattern of LC molecules) may be based on the manipulation of the optic axis of the LC molecules in the LCP layer/bulk PAM layer. Such thin-film LC optical devices are generally called as Pancharatnam Berry Phase (PBP) elements, geometric phase (GP) elements, cycloidal diffractive waveplate (CDW), polarization elements, polarization volume elements, or polarization volume hologram (PVH) elements.

In some embodiments, the manipulation of the optic axis of the LC molecules in the LCP layer may be realized by aligning the LC molecules in the LCP layer on a patterned or uniform aligned PAM layer. In some embodiments, the manipulation of the optic axis of the LC molecules in the bulk PAM layer may be realized by aligning the LC molecules in a patterned or uniform aligned bulk PAM layer.

According to the formed pattern of the optical axes of the LC molecules (i.e., LC orientation) in the LCP layer/bulk PAM layer, the thin-film LC optical device 100 may function as a transmissive or reflective optical element, such as a prism, a lens, a beam refractor, a lens/prims array, a phase retarder. Below various designs of the thin-film LC optical devices are discussed. It should be noted that these designs are merely illustrative, and other designs of the thin-film LC optical devices may be generated using the principles described herein.

Figure 4A:
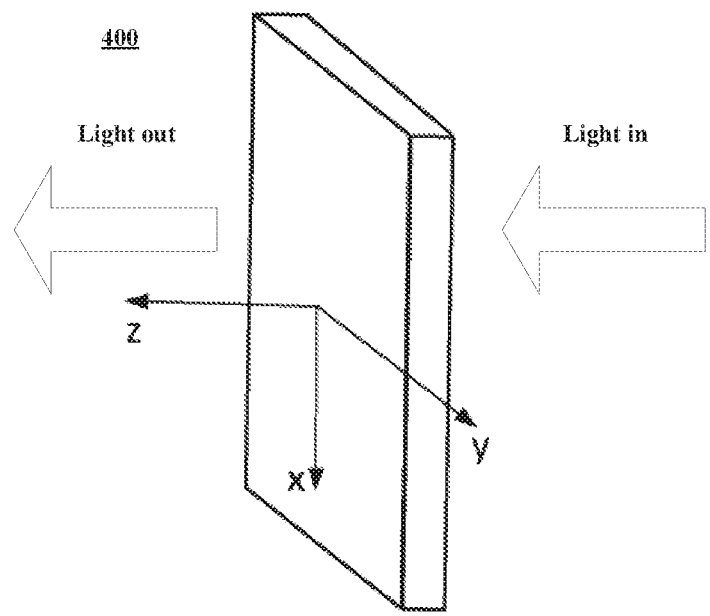
FIG. 4A illustrates an example of a transmissive transferrable and flexible thin-film liquid crystal (LC) optical device consistent with the disclosed embodiments.

FIG. 4A is an example of a transmissive transferable and flexible thin-film LC optical device 400 consistent with the disclosed embodiments. According to the formed pattern of the optical axes of the LC molecules (i.e., LC orientation) in the LCP layer/bulk PAM layer, the thin-film LC optical device 400 may function as a transmissive optical element, such as a prism, a lens, a beam refractor, a lens/prims array, a phase retarder, etc.

Figure 4B:
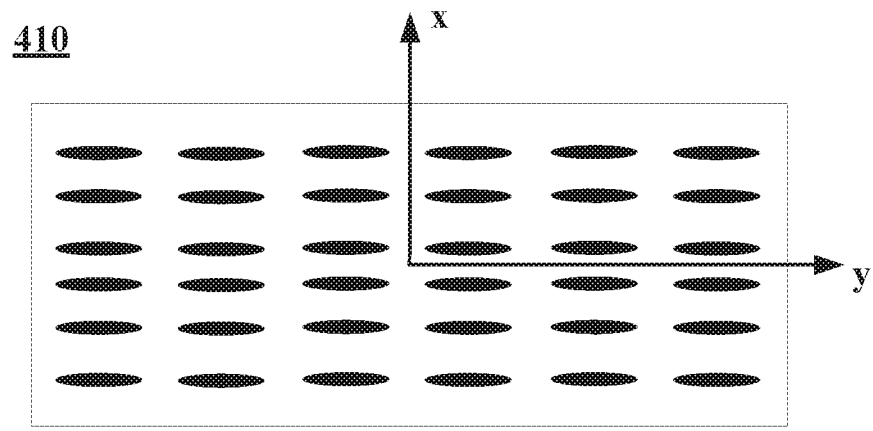
FIG. 4B illustrates an example of LC orientations when the thin-film LC optical device in FIG. 4A is a LC phase retarder consistent with the disclosed embodiments.

FIG. 4B illustrates an example of LC orientations when the thin-film LC optical device in FIG. 4A is a LC phase retarder 410 consistent with the disclosed embodiments. As shown in FIG. 4B, the optic axes of the LC molecules may have a uniform orientation across the entire LC phase retarder 410, which may be realized by aligning the LC molecules in the LCP layer on a uniform aligned PAM layer or aligning the LC molecules in a uniform aligned bulk PAM layer. Without an applied voltage, all of the LC molecules may be aligned due to the uniform aligned PAM layer/ uniform aligned bulk PAM layer. When the LC phase retarder 410 is an active element, the LC phase retarder 410 may allow an active control of the phase of the transmitted light. LC phase retarders are often used instead of conventional wave plates because LC phase retarders can be precisely tuned to retard the transmitted light by up to half of a wavelength over a broad spectral range.

To merely change the phase of the transmitted light, the linearly polarized incident light may be configured to have its polarization axis aligned with the optical axis of the LC phase retarder 410. As the applied voltage gradually increases, the phase offset in the transmitted light may be decreased.

In addition, the LC phase retarder 410 may also be effectively used as a polarization management component. For example, when the LC phase retarder 410 is a half waveplate, linearly polarized incident light having a first polarization direction may be converted to linearly polarized output light having a second first polarization direction perpendicular to the first polarization direction; when the LC phase retarder 410 is a half waveplate, circularly polarized incident light may be converted to circularly polarized output light having a reversed handedness; when the LC phase retarder 410 is a quarter waveplate, the linearly polarized incident light may be converted to circularly polarized output light. When using the LC phase retarder 410 to control the polarization of incident light, the polarization axis of the linearly polarized incident light may be oriented at a 45° angle with respect to the optical axis of the LC phase retarder 410.

Figure 4C:
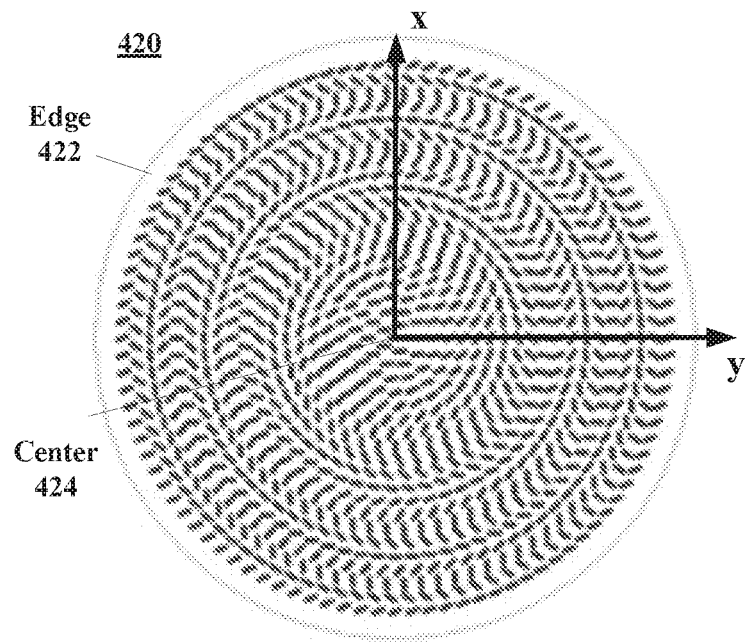
FIG. 4C illustrates an example of LC orientations when the thin-film LC optical device in FIG. 4A is a Pancharatnam Berry Phase (PBP) LC lens consistent with the disclosed embodiments.

FIG. 4C illustrates an example of LC orientations when the thin-film LC optical device in FIG. 4A is a PBP LC lens 420. As shown in FIG. 4C, the PBP LC lens 420 may create a respective lens profile via an in-plane orientation (azimuth angle θ) of the LC molecules, in which the phase difference T=2θ. The azimuth angles of LC molecules may be continuously changed from a center 424 to an edge 422 of the PBP LC lens 420, with a varied pitch Λ. Pitch is defined in a way that the azimuth angle of the LC molecule is rotated by 180° from the initial state. In contrast, a conventional LC lens creates a lens profile via a birefringence (Δn) and layer thickness (d) of liquid crystals, and a number (#) of Fresnel zones (if it is Fresnel lens design), in which the phase difference T=dΔn*#*2π/λ. Accordingly, the PBP LC lens 420 may have a large aperture size and may be made with a very thin LC layer, which allows fast switching speed to turn the lens power on/off.

Figure 4D:
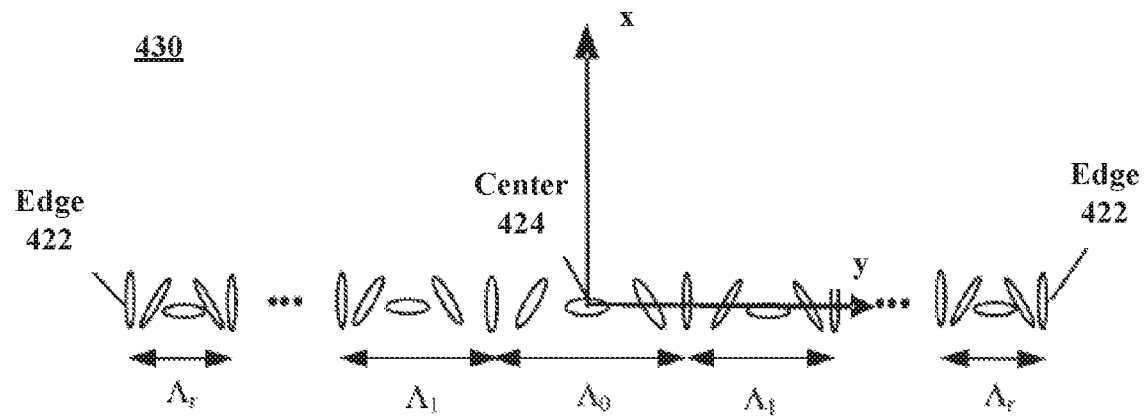
FIG. 4D illustrates a portion of LC orientations in the PBP LC lens in FIG. 4C consistent with the disclosed embodiments.

FIG. 4D is a section of LC orientations 430 taken along y-axis in the PBP LC lens 420 of FIG. 4C. As shown in FIG. 4D, from the liquid crystal orientation 430, a rate of pitch variation may be a function of distance from the lens center 424. The rate of pitch variation may increase with the distance from the lens center 424. For example, the pitch at the lens center 424 ($\Lambda_0$) is the slowest, and the pitch at the edge 422 ($\Lambda_r$) is the highest, i.e., $\Lambda_1 > \Lambda_1 > \ldots > \Lambda_r$. In the x-y plane, to make a PBP LC lens with lens radius (r) and lens power (+l−f), the azimuth angle θ may satisfy θ=r²/2f*(π/λ), where λ is the wavelength of incident light.

Further, an PBP element may active or passive. An active PBP element has three optical states: an additive state, a neutral state, and a subtractive state. The state of an active PBP element is determined by the by the handedness of polarization of light incident on the active PBP element and an applied voltage. In some embodiments, the active PBP element may operate in a subtractive state responsive to incident light with a left-handed circular polarization and an applied voltage of zero (or more generally below some minimal value), operate in an additive state responsive to incident light with a right-handed circular polarization and the applied voltage of zero (or more generally below some minimal value), and operate in a neutral state (regardless of polarization) responsive to an applied voltage larger than a threshold voltage which aligns LCs with positive dielectric anisotropy along with the electric field.

In contrast, a passive PBP element has two optical states: an additive state and a subtractive state. The state of a passive PBP element is determined by the handedness of polarization of light incident on the passive PBP element. In some embodiments, the passive PBP element may operates in a subtractive state responsive to incident light with a left-handed polarization, and operate in an additive state responsive to incident light with a right-handed polarization.

For the PBP LC lens 420 shown in FIG. 4C, an active PBP LC lens is an optical element that has three discrete focal states (also referred to as optical states). The three optical states are an additive state, a neutral state, and a subtractive state. The additive state adds optical power to the system (i.e., has a positive focus of 'f'), the neutral state does not affect the optical power of the system (and does not affect the polarization of light passing through the PBP LC lens), and the subtractive state subtracts optical power from the system (i.e., has a negative focus of '−f'). The state of an active PBP LC lens is determined by the by the handedness of polarization of light incident on the active PBP LC lens and an applied voltage. In contrast, a passive PBP LC lens has two optical states: an additive state which adds optical power to the system (i.e., has a positive focus of 'f') and a subtractive state which subtracts optical power from the system (i.e., has a negative focus of '−f').

Figure 4E:
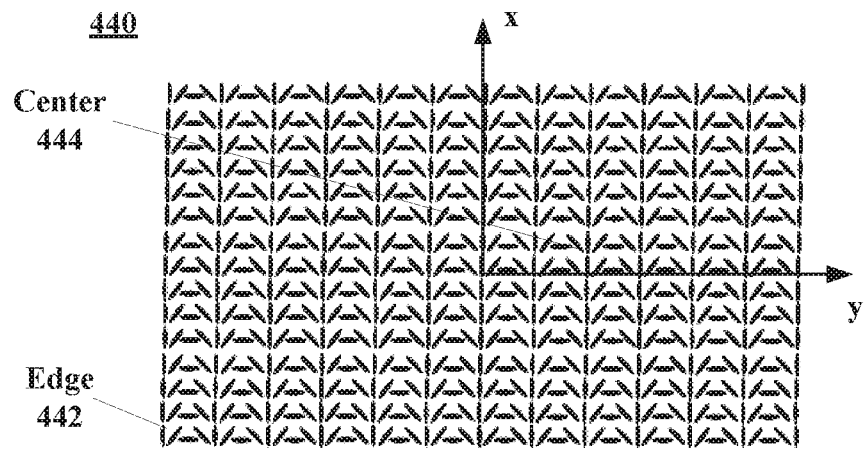
FIG. 4E illustrates an example of LC orientations when the thin-film LC optical device in FIG. 4A is a PBP LC grating consistent with the disclosed embodiments.
Figure 4F:
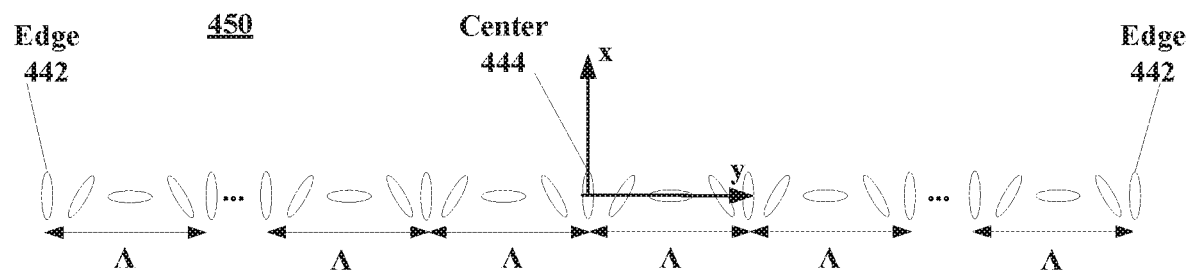
FIG. 4F illustrates a portion of LC orientations in the PBP LC grating in FIG. 4E consistent with the disclosed embodiments.

FIG. 4E illustrates an example of LC orientations when the thin-film LC optical device in FIG. 4A is a PBP LC grating 440, and FIG. 4F shows a section of LC orientations 450 taken along y-axis in the PBP LC grating 440 in FIG. 4E. As shown in FIGS. 4E-4F, in the PBP LC grating/deflector 440, the azimuth angles of the LC molecules may be changed in a linearly repetitive pattern from a center 444 to an edge 442 of the PBP LC grating 440, with a uniform pitch Λ. The pitch Λ of the PBP LC grating 440 may be half the distance along the y-axis between repeated portions of the pattern. The pitch Λ may determine, in part, the optical properties of PBP LC grating 440. For example, circularly polarized light incident along the optical axis (i.e., z-axis) of the PBP LC grating 440 may have a grating output comprising primary, conjugate, and leakage light respectively corresponding to diffraction orders m=+1, −1, and zero. The pitch Λ may determine the diffraction angles (e.g., beam-steering angles) of the light in the different diffraction orders. Generally, the smaller the pitch Λ, the larger the diffraction angle for a given wavelength of light.

For the PBP LC grating 440 shown in FIG. 4E, an active PBP LC grating has three optical states, similar to that of an active PBP LC lens: an additive state, a neutral state, and a subtractive state. In the additive state, the active PBP LC grating diffracts light of a particular wavelength to an angle that is positive relative to the diffraction angle of the subtractive state. In the subtractive state, the active PBP LC grating diffracts light at a particular wavelength to an angle that is negative relative to the positive angle of the additive state. In the neutral state, the PBP LC grating does not lead to a light diffraction and does not affect the polarization of light passing through the active PBP LC grating. In contrast, a passive PBP LC grating has two optical states: an additive state and a subtractive state.

Figure 4G:
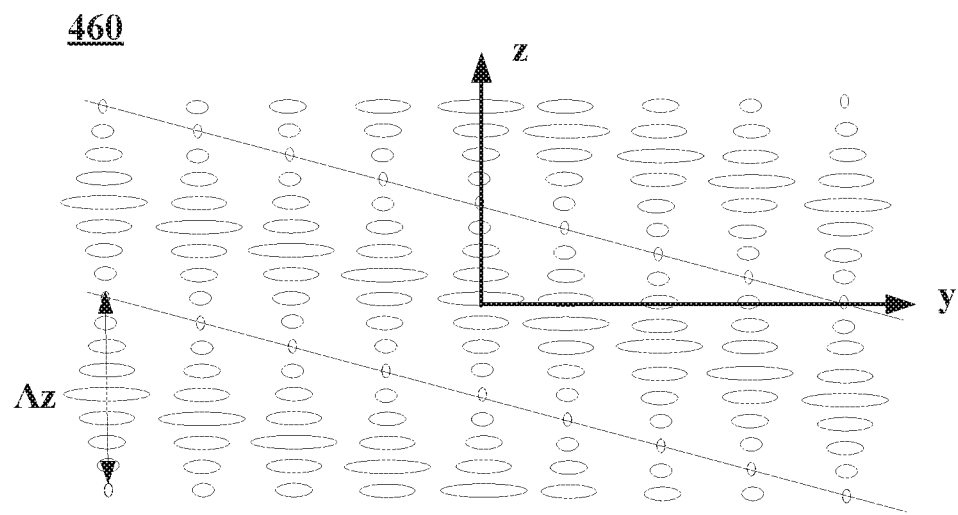
FIG. 4G illustrates an example of LC orientations when the PBP LC grating in FIG. 4E has a dual-twisted structure consistent with the disclosed embodiments.

FIG. 4G shows an example of LC orientations 460 when the PBP LC grating 440 in FIG. 4E has a dual-twisted structure. As shown in FIG. 4G, the directors of the LC molecules along the y-axis may be the same as a non-twisted PBP LC grating, while along z-axis the directors of the LC molecules may twist to a certain degree from the bottom to half away across the LCP layer, then twist back through the top. That is, the vertical pitch $\Lambda z$ may be half the thickness of the thin-film layer.

Figure 5A:
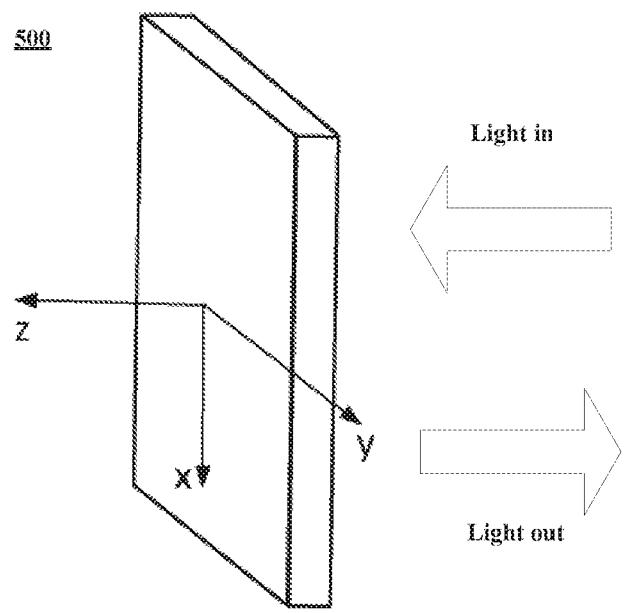
FIG. 5A illustrates an example of a reflective transferrable and flexible thin-film LC optical device consistent with the disclosed embodiments.
Figure 5B:
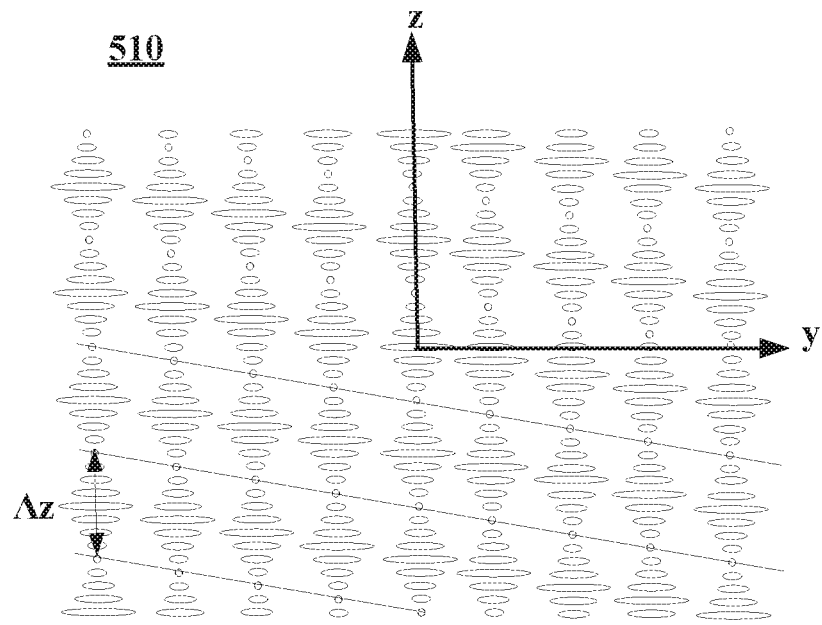
FIG. 5B illustrates an example of LC orientations when the thin-film LC optical device in FIG. 5A is a reflective PBP LC grating consistent with the disclosed embodiments.

In addition to the transmissive thin-film LC optical devices shown in FIGS. 4A-4G, reflective thin-film LC optical devices may also be realized. FIG. 5A illustrates an example of a reflective transferrable and flexible thin-film LC optical device 500 consistent with the disclosed embodiments, and FIG. 5B illustrates an example of LC orientations 510 when the thin-film LC optical device in FIG. 5A is a reflective PBP LC grating consistent with the disclosed embodiments.

The reflective PBP LC grating, due to its physical properties, is also referred as a reflective polarization volume grating (RPVG). As shown in FIG. 5B, the RPVG 500 may incorporates a higher degree of twist along z-direction (i.e., much smaller vertical pitch $\Lambda z$) than the dual-twisted transmissive PBP LC grating shown in FIG. 4G. Although the device structure of the RPVG 500 is somewhat similar to that of the dual-twisted transmissive PBP LC grating shown in FIG. 4G, the deflection mechanism is completely different. Instead of modulating the phase of input light, the RPVG 500 deflects light through Bragg reflection (or slanted multiplayer reflection). In particular, the difference manifests when taking a closer look into the efficiency as a function of the film thickness (i.e., the thickness of the thin-film layer in the z-direction). For the dual-twisted transmissive PBP LC grating shown in FIG. 4G, the efficiency drops as the film thickness increases over the first optimal thickness. However, for the RPVG 500 shown in FIG. 5A, the efficiency increases monotonically with thickness and then gradually saturates.

The disclosed transferrable thin-film optical device may have wide applications in a large variety of fields, such as imaging, optical communication, displays, and biomedical applications, etc., which may significantly reduce the weight and enhance the appearance of systems including one or more transferrable thin-film optical devices. For example, currently the various optical components used in AR/VR/MR HMDs are often costly, rigid, and difficult for size reduction, etc. To satisfy complex display functions while maintaining a small form factor, compactness and light weight, optical components in the AR/VR/MR HMDs are highly desired to be adaptive, light efficient and lightweight.

After attached to any surfaces such as lenses, waveguides, other optical elements, etc., the disclosed transferrable thin-film optical device could be used to build optical components that may be used in the AR/VR/MR HMDs, such as eye-tracking components, accommodation components for multiple focus or variable focus, display resolution enhancement components, pupil steering elements, and a broadband waveplate (e.g. quarter wave-plate or half wave-plate) as a polarization management components, etc., which may significantly reduce the weight and enhance the appearance of the AR/VR/MR HMDs, therefore opening up possibilities to the futuristic AR/VR/MR HMDs.

Figure 6A:
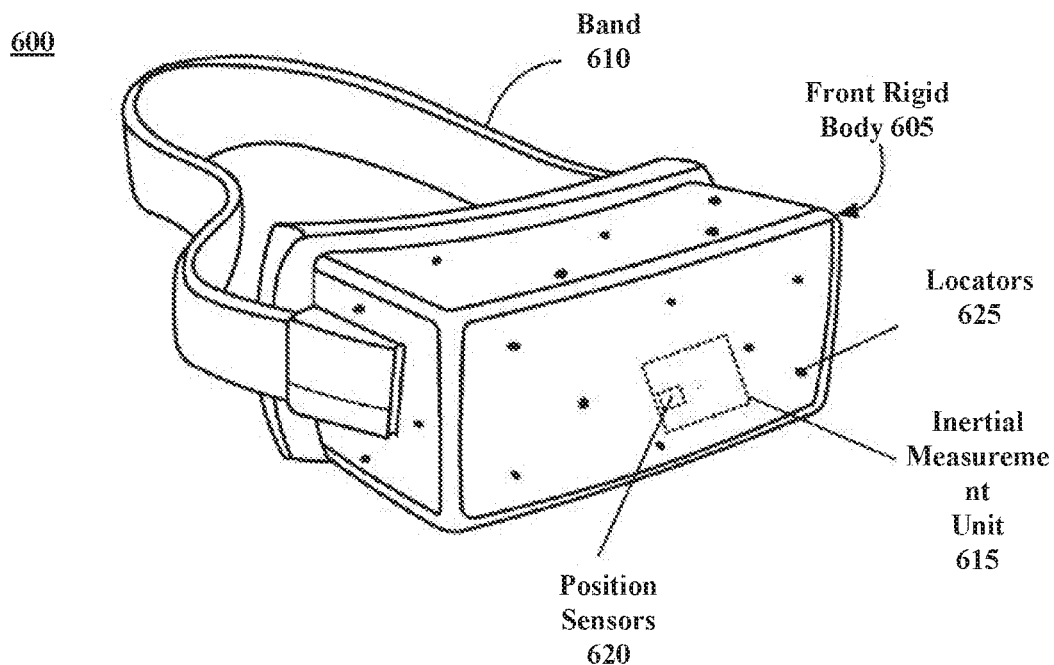
FIG. 6A illustrates a diagram of an embodiment of a head-mounted display consistent with the disclosed embodiments.
Figure 6B:
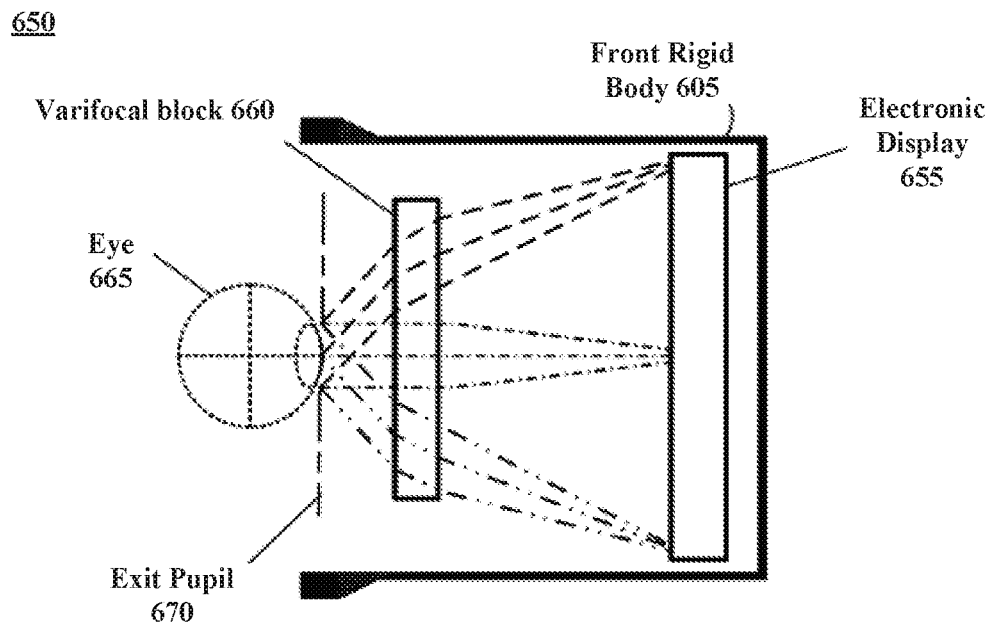
FIG. 6B illustrates a cross section of a front rigid body of the head-mounted display in FIG. 6A consistent with the disclosed embodiments.

FIG. 6A illustrates a diagram of an embodiment of a head-mounted display 600 consistent with the disclosed embodiments, and FIG. 6B illustrates a cross section 650 of a front rigid body of the head-mounted display in FIG. 6A consistent with the disclosed embodiments. The head-mounted display 600 may comprise one or more of the disclosed transferrable and flexible thin-film optical devices.

As shown in FIG. 6A, the HMD 600 may include a front rigid body 605 and a band 610. The front rigid body 605 may include one or more electronic display elements of an electronic display (not shown), an inertial measurement unit (IMU) 615, one or more position sensors 620, and locators 625. In the embodiment shown by FIG. 6A, the position sensors 620 may be located within the IMU 615, and neither the IMU 615 nor the position sensors 620 may be visible to the user. The IMU 615, the position sensors 620, and the locators 625. The HMD 600 may act as a VR or AR or MR device, when the HMD 600 acts as an AR or MR device, portions of the HMD 600 and its internal components may be at least partially transparent.

As shown in FIG. 6B, the front rigid body 605 may include an electronic display 655 and a varifocal block 660 that together provide image light to an exit pupil 670. The exit pupil 670 may be the location of the front rigid body 605 where a user's eye 665 is positioned. For purposes of illustration, FIG. 6B shows a cross section 650 associated with a single eye 665, but another varifocal block 660, separate from the varifocal block 660, provides altered image light to another eye of the user. Additionally, the HMD 600 may include an eye tracking system (not shown). The eye tracking system may include, e.g., one or more sources that illuminate one or both eyes of the user, and one or more cameras that captures images of one or both eyes of the user.

The electronic display 655 may display images to the user. In some embodiments, the electronic display 655 may include a waveguide display or a stacked waveguide display for each eye 665 of the user. For example, the stacked waveguide display may be a polychromatic display (e.g., a red-green-blue (RGB) display) created by stacking waveguide displays whose respective monochromatic sources are of different colors. The waveguide display may include a source assembly which generates image light and an output waveguide which outputs expanded image light to the eye 665 of the user. The output waveguide may include one or more coupling element for coupling light from the source assembly into the output waveguide, decoupling element for decoupling light from the output waveguide to the eye 665 of the user, and directing element for directing light from the coupling element to the decoupling element.

In existing HMDs, the coupling element, directing element and decoupling element each may be, for example, a diffraction grating, a holographic grating, one or more cascaded reflectors, one or more prismatic surface elements, and/or an array of holographic reflectors. However, in the disclosed embodiments, the coupling element, directing element and decoupling element may be realized by the disclosed thin-film LC optical devices with a corresponding structured LC pattern, such as the PBP LC grating shown in FIGS. 4E-4G and FIGS. 5A-5B.

Compared to various gratings used in existing HMDs, such as surface-relief gratings (SRGs) and holographic gratings (HGs), the PBP LC grating may have high efficiency over a large field of view and wider spectral width and, thus, may provide great advantages for waveguide-coupling HMDs used for VR, AR, or MR applications. Further, the PBP LC grating having the dual-twisted structure may offer achromatized efficiency across all visible wavelength. Further, because the RPVG shown in FIGS. 5A-5B allows deflection only for one circularly polarized light while the other polarization will transmit through, when the RPVG is used as a combiner which integrates the displayed images and the real world in AR HMDs, the overall transmittance of the real-world light may be increased.

Further, the varifocal block 660 may adjust a distance of light emitted from the electronic display 655, such that it appears at particular focal distances from the user. The varifocal block 660 may include one or more varifocal structures in optical series. A varifocal structure is an optical device that is configured to dynamically adjust its focus in accordance with instructions from a varifocal system. The varifocal structure may include conventional lenses with fixed optical power and/or variable lenses with adjustable optical power, which may be realized by the disclosed thin-film LC optical devices with a corresponding structured LC pattern, such as the PBP LC lens shown in FIG. 4C.

Design specifications for HMDs used for VR, AR, or MR applications typically requires a large range of optical power to adapt for human eye vergence-accommodation (e.g., ~±2 Diopters or more), fast switching speeds (e.g., ~300 ms), and a good quality image. Note conventional LC lenses may be not well suited to these applications, because a conventional LC lens generally would require the LC materials to have a relatively high index of refraction or be relatively thick (which reduces switching speeds). In contrast, a PBP LC lens is able to meet design specs using LC materials having a relatively low index of refraction and, moreover, the PBP LC lens is thin (e.g., a single liquid crystal layer can be ~2 µm) and has high switching speeds (e.g., 300 ms).

The varifocal structure may also include one or more polarization management components which control the handedness of the circularly polarized light incident onto the PBP LC lens, and the polarization management components may also be realized by the disclosed thin-film LC optical devices with a corresponding structured LC pattern, such as the LC phase retarder shown in FIG. 4B.

In addition, in some embodiments, the varifocal block 660 may magnify received light, correct optical errors associated with the image light, and present the corrected image light is presented to a user of the HMD 600. The varifocal block 660 may additionally include one or more optical elements in optical series, such as an aperture, a Fresnel lens, a convex lens, a concave lens, a filter, or any other suitable optical element that affects the blurred image light, which may also be realized by the disclosed thin-film LC optical devices with a corresponding structured LC pattern.

The above-mentioned applications of the thin-film LC optical device in the HMDs are merely for illustrative purposes. In addition, the disclosed thin-film LC optical devices may also be used to realize eye-tracking components, display resolution enhancement components, and pupil steering elements, etc., which is not limited by the present disclosure. The thin-film LC optical devices are adaptive, light efficient, light-weight and customized optical elements and, thus, through using the thin-film LC optical devices as multifunctional optical components in the HMDs, the weight of HMDs may be significantly reduced while the appearance may be enhanced, therefore opening up the possibilities to the futuristic AR/VR/MR HMDs.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A transferrable thin-film optical device, comprising:
   a substrate; and
   a thin-film liquid crystal layer structurally configured to have liquid crystal molecules aligned in a predetermined alignment pattern to provide at least one predetermined optical function,
   wherein the thin-film liquid crystal layer is configured to be removably attached to the substrate, such that the predetermined alignment pattern of the liquid crystal molecules of the thin-film liquid crystal layer is preserved post removal from the substrate, and wherein the thin-film liquid crystal layer is removably attached to the substrate through a soluble element, which is configured to be dissolved to separate the thin-film liquid crystal layer from the substrate when the thin-film liquid crystal layer is to be transferred to another substrate.

2. The transferrable thin-film optical device according to claim 1,
wherein the soluble element is a soluble synthetic polymer layer.

3. The transferrable thin-film optical device according to claim 1, wherein:
the at least one predetermined optical function of the thin-film liquid crystal layer is provided by in-plane orientations of the liquid crystal molecules configured in the thin-film liquid crystal layer.

4. The transferrable thin-film optical device according to claim 3, wherein:
the in-plane orientations of the liquid crystal molecules in the thin-film liquid crystal layer are configured by aligned photo-alignment materials.

5. The transferrable thin-film optical device according to claim 3, wherein:
the thin-film liquid crystal layer is a liquid crystal polymer layer.

6. The transferrable thin-film optical device according to claim 3, wherein:
the thin-film liquid crystal layer is a bulk photo-alignment material layer that is photo-crosslinked with induced birefringence.

7. The transferrable thin-film optical device according to claim 1, wherein:
the transferrable thin-film optical device is a Pancharatnam Berry phase element.

8. The transferrable thin-film optical device according to claim 1, wherein:
the transferrable thin-film optical device is one or more of a transmissive or reflective prism, a lens, a beam deflector, a lens array, a prism array, and a phase retarder.

9. The transferrable thin-film optical device according to claim 1, wherein:
the thin-film liquid crystal layer includes at least one of nematic liquid crystals, twist-bend liquid crystals, or chiral nematic liquid crystals.

10. The transferrable thin-film optical device according to claim 1, further comprising:
a plurality of electrodes coupled with the thin-film liquid crystal layer, and configured to provide a driving voltage to the thin-film liquid crystal layer,
wherein the plurality of electrodes include one or more flexible transparent conductive layers, and
wherein the electrodes and the thin-film liquid crystal layer are removable from the substrate as a single entity.

11. The transferrable thin-film optical device according to claim 1, further comprising:
an adhesive layer,
wherein the thin-film liquid crystal layer has a first surface facing the substrate and an opposing second surface facing away from the substrate, and wherein the adhesive layer is disposed on the second surface of the thin-film liquid crystal layer.

12. The transferrable thin-film optical device according to claim 11, wherein:
the adhesive layer is an ultraviolet curable isotropic adhesive layer.

13. The transferrable thin-film optical device according to claim 11, wherein:
the adhesive layer is an index-matching layer or an index-mismatching layer.

14. An optical system, comprising:
a first optical device; and
a second optical device that is a thin-film optical device attached to a surface of the first optical device, the thin-film optical device providing at least one predetermined optical function and comprising:
a thin-film liquid crystal layer structurally configured to have liquid crystal molecules aligned in a predetermined alignment pattern to provide the at least one predetermined optical function,
wherein the thin-film liquid crystal layer is configured to be removably attached to a substrate prior to being detached from the substrate and attached to the first optical device, wherein the predetermined alignment pattern of the liquid crystal molecules of the thin-film liquid crystal layer is maintained before and after removal from the substrate, and
wherein the thin-film liquid crystal layer is removably attached to the substrate through a soluble element, which is configured to be dissolved to separate the thin-film liquid crystal layer from the substrate when the thin-film liquid crystal layer is transferred to the first optical device.

15. The optical system according to claim 14, wherein:
the at least one predetermined optical function of the thin-film liquid crystal layer is provided by in-plane orientations of the liquid crystal molecules configured in the thin-film liquid crystal layer.

16. The optical system according to claim 15, wherein:
the in-plane orientations of the liquid crystal molecules in the thin-film liquid crystal layer are provided by aligned photo-alignment materials.

17. The transferrable thin-film optical device according to claim 1, further comprising:
an alignment layer disposed between the substrate and the thin-film liquid crystal layer and configured to align the liquid crystal molecules in the predetermined alignment pattern,
wherein the soluble element is disposed between the alignment layer and the substrate, and is configured to be dissolved to separate the thin-film liquid crystal layer and the alignment layer together from the substrate as a single entity.

18. The transferrable thin-film optical device according to claim 17, wherein a thickness of the thin-film liquid crystal layer is in a range of 0.5 µm to 10 µm, and a thickness of the soluble element is in a range of 0.1 µm to 10 µm.

* * * * *